Feb. 2, 1960 P. ROBINSON 2,923,867
ELECTROLYTIC CAPACITORS
Filed July 2, 1956
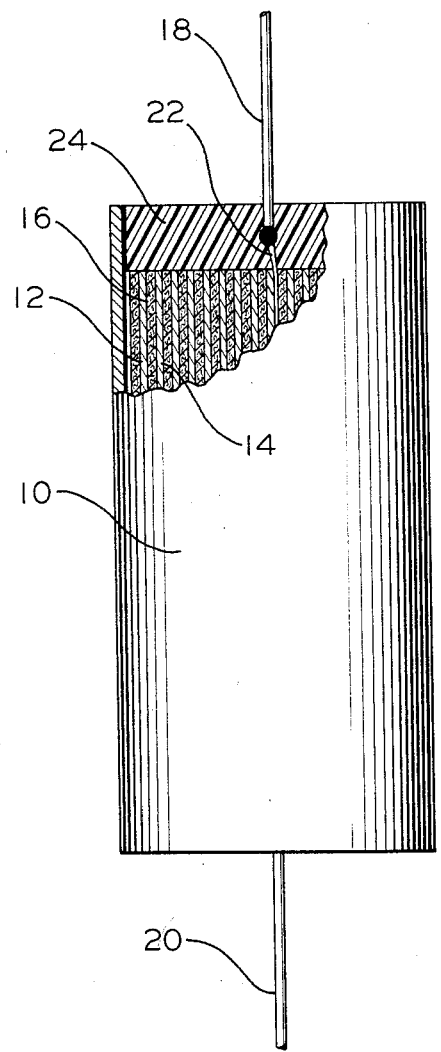
INVENTOR.
PRESTON ROBINSON
BY
Roland A. Dexter
HIS ATTORNEY

2,923,867

ELECTROLYTIC CAPACITORS

Preston Robinson, Williamstown, Mass., assignor to Sprague Electric Company, North Adams, Mass., a corporation of Massachusetts Application July 2, 1956, Serial No. 595,525

6 Claims. (Cl. 317—230)

This invention relates to improved electrolyte systems and more particularly refers to organic electrolytes that can contain up to a small percentage of water and are useful in electrolytic devices such as capacitors.

The electrolytic capacitor has been the subject of extended research and large scale use during the last half century. Most capacitors of this type have been made with anodes consisting of aluminum foil having a thin dielectric coating of oxide. The patent and technical literature abounds with suggested ionizable solutes as well as the solvents for them which are useful as forming and/or working electrolytes for electrolytic capacitors. Of this multitude of electrolytes which have been disclosed, few have achieved commercial significance, and at the present, most electrolytic capacitors employ relatively simple systems containing boric acid or a borate dissolved in a solvent such as water or ethylene glycol. The so-called dry electrolyte contains only small amounts of free water.

While the electrolytes of the type referred to above are quite suitable for many capacitor applications, they are generally unsatisfactory for use in capacitors which are subjected to extreme high or low temperatures of operation and other special operating conditions. This deficiency has become most apparent in the operation of electronic equipment at low temperatures, that is temperatures of −50 to −60° C. and in miniature devices of high capacities that are desired for use in low voltage applications as for transistor circuitry. It has been further found that electrolytic capacitors using the conventional electrolytes referred to above suffer from relatively poor shelf-life. Additionally, failure to maintain operating voltages on conventional capacitative units results in a substantial drop in capacity and requires, after application of voltage, a finite time to raise the capacity to the requisite circuit value, thus effectively disabling the electronic circuit for a period of time.

It is an object of the present invention to overcome the foregoing and related disadvantages. A further object is to produce new and useful electrolyte systems for electrolytic capacitors which are characterized by excellent stability over extended periods of non-use and of a satisfactorily low dissipation factor at depressed operating temperatures. Additional objects will become apparent from the following description and appended drawing in which the sole figure shows in partial cross-section an encased capacitor section impregnated with the electrolyte of the invention to produce a stable capacitor of unique electrical operational characteristics.

These objects are attained in accordance with the invention wherein there is produced an electrolytic capacitor having a plurality of electrodes, at least one of said electrodes being a formed valve metal, and an electrolyte contiguous with said electrodes comprising a solute of a salt of an organic amine having the formula:

$$[C_aH_{2a-b+1}(OH)_b]_c NH_{3-c}$$

wherein $a$ is an integer from 1 to 5, $b$ is an integer from 0 to 1 and $c$ is an integer from 1 to 3, and a fluorine substituted lower aliphatic acid dissolved in an organic solvent containing up to about 10% by weight of water.

In its limited and preferred embodiment the invention is concerned with an electrolytic capacitor having an anode and a cathode separated by a porous spacer, said anode consisting of an oxide coated aluminum foil and an electrolyte contiguous with said anode and said cathode consisting essentially of ethanol ammonium trifluoroacetate dissolved in ethylene glycol and water, said water in an amount of up to about 10% by weight of the total electrolyte.

According to my invention, I have found that a special class of organic electrolyte solute introduced into an organic solvent can be used as an electrolyte for many types of electrolytic capacitors and other devices in which the prior known electrolyte systems were unsatisfactory. In particular, my electrolytes show exceptionally low dissipation factors at depressed temperatures in the order of −50 to −60° C. while at the same time being satisfactory for normal operation, as for example, at room temperatures and upward of 85° C., and excellent stability after remaining idle for long periods of time, that is in the order of two years without appreciable change in capacity or power factor. The exceptional nature of my electrolytes is further manifested by excellent operational characteristics for capacitors having extremely high capacities per unit volume, that is capacitors which are formed to relatively low voltages, that is from 1.5 to 50 volts. The devices of the invention fill an outstanding need for components useful in transistor and comparable circuitry.

This special class of organic electrolyte solute consists of a cation which is selected from the lower alkyl and hydroxy substituted lower alkyl amines and an anion of a fluorinated aliphatic acid, the degree of fluorine substitution may be partial, that at least one hydrogen of aliphatic chain should be replaced by fluorine, although it is preferably completely fluorinated. The amines may be primary, secondary or tertiary for use in this invention of which representative useful amines are hereafter set forth: isopropylamine, di-isopropylamine, tri-propylamine, iso-propanolamine, di-isopropanolamine, tri-isopropanolamine, n-butylamine, di-butylamine, tri-n-butylamine, n-butanolamine, di-n-butanolamine, tri-n-butanolamine, ethylamine, diethylamine, triethylamine, ethanolamine, diethanolamine, triethanolamine, n-hexylamine, 2-ethyl hexylamine, di(2-ethyl hexyl) amine, methanolamine, dimethanolamine, trimethanolamine, pentylamine, tripentylamine, dipentylamine, pentanolamine, dipentanolamine, tripentanolamine, tetraethylene pentamine, n-acetyl ethanolamine. For the purposes of this invention, lower alkyl will include up to eleven carbon atoms in the alkyl group. Those fluoro-substituted aliphatic acids up to seven carbon atoms, which are reacted with the amines set forth above to produce the novel electrolyte solute include: trifluoroacetic, perfluorobutyric, perfluoroproprionic, perfluorovaleric and perfluorocaproic acid. Fluoroformic acid is not suitable and therefore is not included within the scope of this invention.

The solvent which forms an integral part of the electrolytic combination of the invention is organic, having preferably a high dielectric constant, wide temperature range of liquidity (−60° C. to 100° C. and higher), stability under imposed temperature and voltage stress conditions and solubility for the conducting solute. These solvents include polyhydroxy alcohols having the formula: $C_nH_{2n+2}O_m$ wherein $n$ is an integer from 2 to 4 and $m$ is an integer from 2 to 3, representative compounds of which are ethylene glycol, trimethylene glycol, tetramethylene glycol, diethylene glycol and glycerol; the lower alkyl phosphates such as are set forth in the copending Ross application, Serial No. 519,363, filed July 1, 1955 of which representative compounds are: triethylphosphate, tripropylphosphate, tri-n-butylphosphate, triisoamylphosphate and butyl di-isoamylphosphate; mono and di lower alkyl substituted lower alkyl amides such as dimethyl formamide, dimethyl acetamide, diethylformamide, diethylacetamide, di-isobutylformamide, n-ethylformamide, n-methylproprionamide and n-methylvaleramide, all of which are fully set forth in the copending Ross applications, Serial Numbers 575,790 and 575,791, both filed on April 3, 1956. Further solvents which can be used to advantage in my invention include halogenated hydrocarbons as 1,2-dichloroethane, 1,2-dibromoethane and dibromomethane; partially fluorinated hydrocarbons; nitro alkanes such as nitromethane and nitroethane; and unsubstituted simple nitriles, hydrocarbons substituted only with CN, such as malono nitrile, n-caprylonitrile, n-pelargo nitrile and o-tolunitrile. The above solvents can be modified as desired by the addition of water in amounts up to about 10% by weight of the total electrolyte. This addition of water can affect a lower resistivity so that the electrolyte is more suitable for applications at depressed temperatures.

Ordinarily, the concentration of this solute to solvent is varied from about 5% to about 65% by weight of the solute based upon the total weight of the electrolyte, however, the preferred range for operation is about 30% to about 60% by weight of solute in the electrolyte. Resistivities of systems typical of the electrolyte of the invention are preferably less than 500 ohms centimeters at 25° C. One might generalize that the lower the resistivity, the less the loss of energy within the capacitor, hence improved electrical characteristics of the unit, but this resistivity must not become so low as to produce what is known to the art as scintillation of the capacitor (breakdown of the dielectric layer) at the working voltages. Surprisingly, my invention has low loss characteristics coupled with operability at the voltages taught.

The type of anode metal useful, of course, depends upon the nature of the final application. Aluminum and tantalum have both been successfully used as anode materials in the electrolytic capacitors of my invention. Other valve metals also may be used which include titanium, zirconium, columbium, magnesium and bismuth, where their particular anodic characteristics are of interest and utility.

In many of the electrolytic capacitor applications, it is advantageous to impose a porous spacer between the electrodes so as to maintain mechanical separation of the elements. This is particularly desirable in the convolutely wound electrolytic capacitor. The porous spacer must be chemically inactive in the electrolyte, operable at temperatures of at least 85° C. and preferably higher, of relative homogeneity in physical properties, and of a range in thickness of .3 mil to about 3 mils. Suitable spacers include paper, particularly of the kraft type, which may be either uncoated or coated with resins which meet the above requirements, for example, isocyanate cross-linked cellulose acetate, and non-woven fibers as fiberglass mats. The spacers can also include porous resins, particularly the fluorinated ethylenes as polytetrafluoroethylene and polymonochlorotrifluoroethylene. A porous film of polytetrafluoroethylene is fully disclosed in the copending Peck United States patent application, Serial No. 252,236, filed October 20, 1951, now Patent No. 2,790,999.

Reference should now be made to the appended drawing in which 10 represents an encased capacitor section in partial cross-section. The electrolytic capacitor section is seen to be of convolutely wound construction wherein the cathode 12 of an unformed, unetched foil is separated by impregnated porous spacer 16 from the etched and formed anode foil 14. The terminal lead wires 18 and 20 extend respectively from the cathode and anode of the capacitor section. These lead wires are butt welded to their respective capacitor tabs, one of which is shown as 22. These tabs, of the same valve metal as the electrodes, are connected to their respective electrodes by conventional means such as stitching or cold welding. It is seen that the butt weld of the lead wire 18 to the tab 22 is positioned within the resin end seal 24. A resin suitable for sealing a capacitor structure of this configuration is an ethoxyline resin filled with a non-conducting filler such as silica powder. These ethoxyline resins are generally produced by the condensation of epichlorohydrin with a bisphenol, polymerization of which is brought about by thermal treatment, and a catalyst such as phenylene diamine. The outer housing structure containing the capacitor section and impregnated electrolyte can be of any suitable construction known to the art, including metal or a paper tube impregnated with a thermoset resin. The spacers 16 are impregnated with the alkyl or hydroxy alkyl amine fluorine substituted aliphatic acid ionizable salt dissolved in one of the organic solvents previously set forth. Although the anode in the drawing has been shown as a foil construction, the electrolyte of this invention is equally suitable for etched wire and porous pellet types.

The following examples of the preparation of the electrolyte system and the electrolyte capacitors prepared with it further illustrate the practice of my invention.

*Example I*

Ethanolammonium trifluoroacetate was prepared as follows:

204 grams of ethanolamine was added dropwise with vigorous stirring to a liter of dry benzene containing 376 grams of trifluoroacetic acid. The salt was filtered from the cooled reaction mixture and dissolved in 400 cc. of acetone. Precipitation by adding 650 cc. of dry benzene followed by vacuum drying of the filtered precipitate over solid sodium hydroxide yielded 540 grams of a snow-white crystal having a melting point of 86–87° C. The electrolyte was prepared by dissolving 540 grams of the ethanolammonium trifluoroacetate to the same weight of ethylene glycol, dissolution of which is aided by mild heating of the system (40–50° C.). The electrolyte is colorless and has a resistivity at 25° C. of 220 ohm centimeters. The electrolyte was thereafter impregnated into a convolutely wound foil electrolytic capacitor. The anode was of a 3 mil thick aluminum foil, electrochemically etched in an aqueous solution of sodium chloride, formed to 15 volts in an electrolyte of 10% by weight of boric acid in water. This anode was 4¾ inches long and ⅜ inch in width. The cathode of 3 mil thick aluminum, 5 inches in length and ⅜ inch in width was neither etched nor formed. The anode and cathode, terminated with aluminum tabs stitched to their respective electrodes, were physically separated by a single layer of kraft paper of 1.2 mils thickness. The introduction of the electrolyte into the capacitor structure was by conventional vacuum techniques at 25° C. Thereafter, the impregnated section was placed in a metallic container and hermetically sealed with end seals of filled epoxy resin. The tabs, prior to stitching to their respective electrodes, were butt welded to tin-copper leads which served as the lead wires. The butt weld was placed within the resin end seal. The unit was found to have an operational temperature range extending beyond −60° to +85° C. and a capacity of 50 mfds. with a rated voltage of 12 volts. This unit had substantially constant capacity over the entire temperature range set forth above with a very low dissipation factor, as well as surprising stability on shelf-life, that is units can stand for periods greater than 2 years without appreciable change in capacity or dissipation factor.

Similar results are possible with the following electrolytes when used in the capacitor structure above, or other comparable structures known to the art:

50% by weight of ethanol ammonium trifluoroacetate dissolved in ethylene glycol to which is added 10% by weight of water based upon the unmodified electrolyte. This electrolyte had a resistivity at 25° C. of 109 ohm centimeters and produced a capacitor of unique low temperature properties; 10% by weight of tri-n-butylammonium perfluorobutyrate dissolved in dimethylformamide; 30% by weight of tri-n-butylammonium perfluoroacetate in tri-n-butylphosphate; 15% by weight of N,N-diethyl ethanolammonium perfluorovalerate dissolved in tetramethylene glycol; 15% by weight of diethanolammonium trifluoroacetate dissolved in 1,2-dichloroethane; and 20% by weight of trimethanolammonium trifluoroacetate dissolved in caprylonitrile.

My invention makes possible the use of low voltage formed valve metals as the electrodes in high capacity per unit volume electrolytic capacitors operable without substantial change electrically over the temperature range of from 85° C. to depressed temperatures of from −50 to −70° C. Even at these depressed temperatures the units have a very low dissipation factor and little change in capacity from the room temperature value. It is further remarkable that these units have exceptional stability when not used for long periods of time, for in contrast to the usual electrolytic capacitors which require, after extended shelf-like, substantial amounts of current initially to reform the dielectric film so as to produce the desired capacity, my units can remain off a voltage for periods in excess of two years without detectable change in capacity or power factor.

As many apparently widely different embodiments of this invention may be made without departing from the spirit and scope hereof, it is to be understood that this invention is not limited to the specific embodiments hereof except as defined in the appended claims.

I claim:

1. An electrolytic capacitor having a plurality of electrodes, at least one of said electrodes being composed of a valve metal with a dielectric film formed on the electrode surface, a dielectric film preserving electrolyte contiguous with said electrodes comprising a solute of a salt of approximately equimolar proportions of an alkyl amine having the formula:

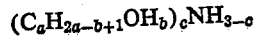

where $a$ is an integer from 2 to 5 and $b$ is an integer from 0 to 1 and $c$ is an integer from 1 to 3 and a fluorine substituted lower aliphatic acid dissolved in a range of 5% to 65% of the total weight of the electrolyte in an organic solvent containing up to about 10% by weight of water.

2. The capacitor of claim 1 in which the solvent is a polyhydroxy alcohol.

3. The capacitor of claim 1 in which the solute is ethanol ammonium trifluoroacetate.

4. An electrolytic capacitor having a plurality of electrodes, one of said electrodes being composed of a valve metal with a dielectric film formed on the electrode surface and a non-aqueous dielectric-film-preserving electrolyte contiguous with said electrodes, comprising a solute of the salt of approximately equimolar proportions of an organic amine of the class of lower alkyl amines and hydroxy substituted lower alkyl amines and a fluorine substituted aliphatic acid having from 2 to 5 carbon atoms dissolved in a range of 5% to 65% of the total weight of the electrolyte in an organic solvent.

5. An electrolytic capacitor having an anode and a cathode separated by a porous spacer, said anode consisting of oxide coated aluminum, and an oxide coating preserving electrolyte contiguous with said anode and said cathode comprising the reaction product of approximately equimolar proportions of ethanol amine and trifluoroacetic acid dissolved in ethylene glycol, said acetate salt present in from about 5% to about 60% by weight of the total electrolyte.

6. The capacitor of claim 5 in which the electrolyte has up to about 10% by weight of water.

References Cited in the file of this patent

UNITED STATES PATENTS

| | | |
|---|---|---|
| 2,036,669 | Yngve | Apr. 7, 1936 |
| 2,694,678 | McLeod | Nov. 16, 1954 |
| 2,759,132 | Ross | Aug. 14, 1956 |

UNITED STATES PATENT OFFICE

CERTIFICATE OF CORRECTION

Patent No. 2,923,867                                        February 2, 1960

Preston Robinson

It is hereby certified that error appears in the printed specification of the above numbered patent requiring correction and that the said Letters Patent should read as corrected below.

Column 2, line 44, for "di-butylamine" read -- di-n-butylamine --; column 4, line 45, for "fail" read -- foil --.

Signed and sealed this 12th day of July 1960.

(SEAL)
Attest:
KARL H. AXLINE
Attesting Officer

ROBERT C. WATSON
Commissioner of Patents